United States Patent
Zhang (10) Patent No.: US 12,362,900 B2
(45) Date of Patent: Jul. 15, 2025

(54) CLOCK SYNCHRONIZATION METHOD, APPARATUS AND SYSTEM, ELECTRONIC DEVICE AND READABLE MEDIUM

(71) Applicant: ZTE CORPORATION, Guangdong (CN)

(72) Inventor: Chuntian Zhang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 82 days.

(21) Appl. No.: 18/569,264

(22) PCT Filed: Jun. 14, 2022

(86) PCT No.: PCT/CN2022/098538
§ 371 (c)(1),
(2) Date: Dec. 12, 2023

(87) PCT Pub. No.: WO2023/273863
PCT Pub. Date: Jan. 5, 2023

(65) Prior Publication Data
US 2024/0223347 A1    Jul. 4, 2024

(30) Foreign Application Priority Data
Jun. 29, 2021   (CN) .......................... 202110727740.5

(51) Int. Cl.
H04L 7/00      (2006.01)

(52) U.S. Cl.
CPC .......... H04L 7/0008 (2013.01); H04L 7/0016 (2013.01)

(58) Field of Classification Search
CPC ........................... H04L 7/0008; H04L 7/0016
See application file for complete search history.

(56) References Cited

U.S. PATENT DOCUMENTS

| | | |
|---|---|---|
| 8,959,268 B2 * | 2/2015 | Hiraoka .................. H04L 25/14 713/400 |
| 2016/0365969 A1 * | 12/2016 | Ministeru ............. H04L 1/0045 |
| 2018/0083604 A1 * | 3/2018 | Lu .............................. G06F 1/04 |
| 2022/0382321 A1 * | 12/2022 | Man ........................ G06F 11/27 |
| 2023/0208677 A1 * | 6/2023 | Kaulmann ........ H04L 12/40084 |
| 2024/0223347 A1 * | 7/2024 | Zhang ................. H04L 63/0846 |

* cited by examiner

*Primary Examiner* — Jaison Joseph
(74) *Attorney, Agent, or Firm* — Li & Cai Intellectual Property (USA) Office (57) ABSTRACT

The present application discloses a clock synchronization method, apparatus and system, an electronic device and a readable medium. The method includes: sampling an initial password sequence according to a first key clock signal to obtain a sampled password sequence; and sending the first key clock signal and the sampled password sequence to a slave clock apparatus to synchronize a phase of a second key clock signal with a phase of the first key clock signal, with the second key clock signal determined by the slave clock apparatus according to the first key clock signal and the sampled password sequence.

20 Claims, 5 Drawing Sheets

FIG. 9

CLOCK SYNCHRONIZATION METHOD, APPARATUS AND SYSTEM, ELECTRONIC DEVICE AND READABLE MEDIUM

CROSS-REFERENCE TO RELATED APPLICATIONS

The present disclosure is a National Phase Application filed under 35 U.S.C. 371 as a national stage of PCT/CN2022/098538, filed on Jun. 14, 2022, an application claiming the priority to Chinese Patent Application No. 202110727740.5 filed with the CNIPA on Jun. 29, 2021, the contents of which are incorporated herein by reference in their entirety.

TECHNICAL FIELD

The present disclosure relates to, but is not limited to, communication technology.

BACKGROUND

At present, with the development of communication technology, a requirement on precision of clock synchronization becomes higher and higher. For example, a clock board of a communication device is connected to multiple line boards through a backplane in a point-to-point or bus manner, and a delay of a clock signal cannot be avoided in a transmission process of the clock signal; and moreover, aging and temperature drift of hardware devices and inconsistency of the devices may lead to a change of a phase of the clock signal in the transmission process thereof. Therefore, a time output deviation of a station is increased, which makes it hard to meet the high-precision time synchronization requirement.

SUMMARY

In one aspect of the present disclosure, a clock synchronization method for a master clock apparatus is provided and includes: sampling an initial password sequence according to a first key clock signal to obtain a sampled password sequence; and sending the first key clock signal and the sampled password sequence to a slave clock apparatus to synchronize a phase of a second key clock signal with a phase of the first key clock signal, with the second key clock signal determined by the slave clock apparatus according to the first key clock signal and the sampled password sequence.

In another aspect of the present disclosure, a clock synchronization method for a slave clock apparatus is provided and includes: acquiring an intermediate key clock signal derived from a first key clock signal sent by a master clock apparatus; sampling a sampled password sequence sent by the master clock apparatus according to the intermediate key clock signal; and shifting, according to a sampling result, a phase of the intermediate key clock signal to be synchronous with a phase of the first key clock signal to obtain a second key clock signal, with a phase of the second key clock signal being synchronous with the phase of the first key clock signal.

In yet another aspect of the present disclosure, a master clock apparatus is provided and includes: a sampling module configured to sample an initial password sequence according to a first key clock signal to obtain a sampled password sequence; and a sending module configured to send the first key clock signal and the sampled password sequence to a slave clock apparatus to synchronize a phase of a second key clock signal with a phase of the first key clock signal, with the second key clock signal determined by the slave clock apparatus according to the first key clock signal and the sampled password sequence.

In still another aspect of the present disclosure, a slave clock apparatus is provided and includes: an acquisition module configured to acquire an intermediate key clock signal derived from a first key clock signal sent by a master clock apparatus; a sampling module configured to sample a sampled password sequence sent by the master clock apparatus according to the intermediate key clock signal; and a phase shift module configured to shift, according to a sampling result, a phase of the intermediate key clock signal to be synchronous with a phase of the first key clock signal to obtain a second key clock signal, with a phase of the second key clock signal being synchronous with the phase of the first key clock signal.

In still another aspect of the present disclosure, a clock synchronization system is provided and includes: the master clock apparatus and the slave clock apparatus as described above; wherein the number of slave clock apparatuses is more than one.

In still another aspect of the present disclosure, an electronic device is provided and includes: one or more processors; a memory having stored thereon one or more programs which, when executed by the one or more processors, cause the one or more processors to implement any clock synchronization method described herein; and one or more input/output (I/O) interfaces connected between the one or more processors and the memory and configured to enable information interaction between the one or more processors and the memory.

In still another aspect of the present disclosure, there is provided a computer-readable medium having stored thereon a computer program which, when executed by a processor, implements any clock synchronization method described herein.

DETAIL DESCRIPTION OF EMBODIMENTS

In order to enable those of ordinary skill in the art to better understand the technical solutions of the present disclosure, the embodiment provided by the present disclosure is described in detail below with reference to the drawings.

Exemplary embodiments will be described more fully below with reference to the drawings, but the exemplary embodiments described may be embodied in different forms, and should not be interpreted as being limited to the embodiments described herein. Rather, the embodiments are provided to make the present disclosure thorough and complete, and are intended to enable those of ordinary skill in the art to fully understand the scope of the present disclosure.

The term "and/or" used herein includes any and all combinations of one or more associated listed items.

The terms used herein are merely used to describe specific embodiments, and are not intended to limit the present disclosure. As used herein, "a" and "the" which indicate a singular form are intended to include a plural form, unless expressly stated in the context. It should be further understood that the term(s) "include" and/or "be made of" used herein indicate(s) the presence of the described features, integers, operations, elements and/or components, but do not exclude the presence or addition of one or more other features, integers, operations, elements, components and/or combinations thereof.

The embodiments described herein can be described with reference to plans and/or cross-sectional views with the aid of idealized schematic diagrams of the present disclosure. Accordingly, the exemplary drawings may be modified according to manufacturing techniques and/or tolerances. Therefore, the embodiments are not limited to those illustrated by the drawings, but include modifications to configuration formed based on a manufacturing process. Thus, regions shown in the drawings are illustrative, and shapes of the regions shown in the drawings illustrate specific shapes of regions of elements, but are not intended to make limitations.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

At present, with the development of communication technology, a requirement on precision of clock synchronization becomes higher and higher. For example, a clock board of a communication device is connected to multiple line boards through a backplane in a point-to-point or bus manner, and a delay of a clock signal cannot be avoided in a transmission process of the clock signal; and moreover, aging and temperature drift of hardware devices and inconsistency of the devices may lead to a change of a phase of the clock signal in the transmission process thereof. Therefore, a time output deviation of a station is increased, which makes it hard to meet the high-precision time synchronization requirement.

Two methods are usually adopted for solving the above problem. One is a hardware measurement method of a single board: an oscilloscope is used to measure a phase delay between a clock board and a line board in practical applications, and the phase delay is compensated manually. This method is low in efficiency in the case of multi-slot communication equipment, and the manual measurement involved has low precision. The other method is adding or reusing a loopback line from a line board to a clock board: assuming that a delay of the loopback line is equal to a delay from the clock board to the line board, and a total delay of the loopback line is measured with the clock board, and is then halved to obtain a value regarded as a phase delay from the clock board to the line board. A premise of this method is that it needs to be ensured that a loopback path of a clock is consistent with a transmission path of the clock and the devices passed by the clock on the loopback path are consistent with the devices passed by the clock on transmission path and that it also needs to be ensured that the devices have same consistency, which causes high requirements on wiring complexity of a hardware design and on performance of the devices. Moreover, neither a delay of a wire of a device nor a delay inside the device cannot be determined, which may cause an error and a failure to meet the high precision requirement.

Figure 1:
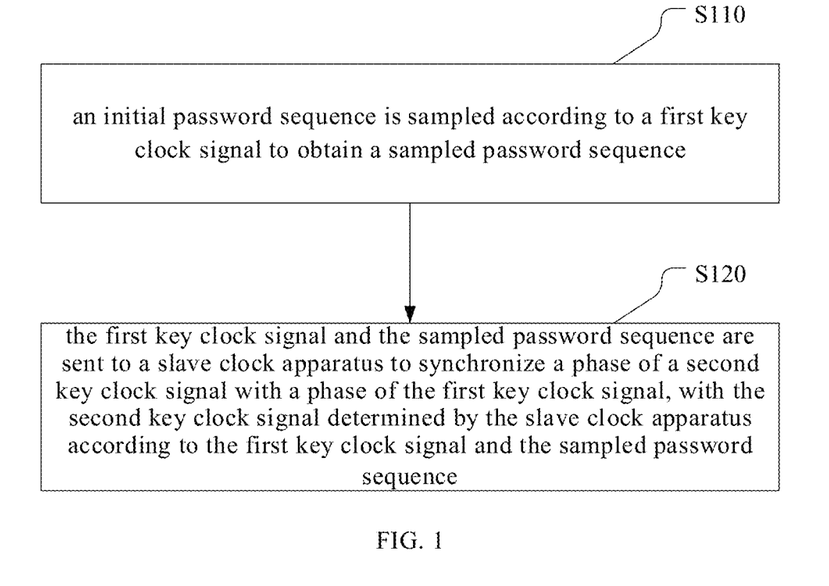
FIG. 1 is a flowchart illustrating a clock synchronization method according to the present disclosure.

FIG. 1 is a flowchart illustrating a clock synchronization method according to the present disclosure. The present embodiment is intended to provide a description from the point of view of a master clock apparatus. As shown in FIG. 1, the method may include the following operations S110 and S120.

In operation S110, an initial password sequence is sampled according to a first key clock signal to obtain a sampled password sequence.

The first key clock signal is generated by the master clock apparatus for the sampling of the initial password sequence. The initial password sequence is a sequence of numbers. Exemplarily, the initial password sequence may be sampled at transition edges of the first key clock signal, so as to obtain the sampled password sequence.

In operation S120, the first key clock signal and the sampled password sequence are sent to a slave clock apparatus to synchronize a phase of a second key clock signal with a phase of the first key clock signal, with the second key clock signal determined by the slave clock apparatus according to the first key clock signal and the sampled password sequence.

Exemplarily, due to influences of a transmission delay and an internal error of a device, a phase difference exists between the first key clock signal sent by the master clock apparatus and an intermediate key clock signal received by the slave clock apparatus. Therefore, when the phase difference exists between the intermediate key clock signal and the first key clock signal, a correct sampling result cannot be obtained when sampling the sampled password sequence using the intermediate key clock signal. Accordingly, phase shift processing is performed on the intermediate key clock signal; and when a phase of the phased-shifted intermediate key clock signal is synchronous with the phase of the first key clock signal, a correct sampling result corresponding to the sampled password sequence may be obtained by using the intermediate key clock signal (i.e., the second key clock signal). Thus, phase synchronization of the master clock apparatus and the slave clock apparatus can be ensured through the sampling operation using the key clock signal.

In the clock synchronization method provided by the present disclosure, the sampled password sequence is sampled according to the key clock signal, and the correct sampling result can be obtained when the phase of the second key clock signal is synchronous with the phase of the first key clock signal; and the correct sampling result cannot be obtained if the phase of the second key clock signal is not synchronous with the phase of the first key clock signal. With the method, the phase synchronization of the master clock apparatus and the slave clock apparatus can be realized through the sampling result using the key clock signal, with no need for the hardware measurement and manual compensation method, so that efficiency and precision are improved; and moreover, there is no need to rely on the loopback line from the line board to the clock board, so that a range of application scenarios is widened, and the error caused by the delays inside the devices is avoided.

Figure 2:
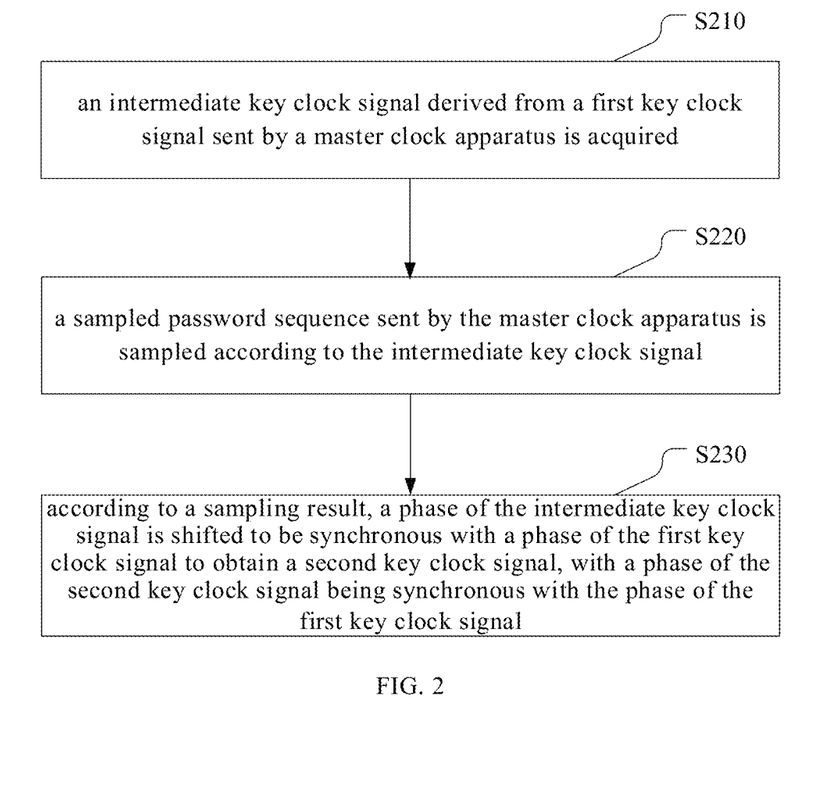
FIG. 2 is a flowchart illustrating a clock synchronization method according to the present disclosure.

FIG. 2 is a flowchart illustrating a clock synchronization method according to the present disclosure. The present embodiment is intended to give a description from the point of view of a slave clock apparatus. As shown in FIG. 2, the method may include the following operations S210 to S230.

In operation S210, an intermediate key clock signal derived from a first key clock signal sent by a master clock apparatus is acquired.

In operation S220, a sampled password sequence sent by the master clock apparatus is sampled according to the intermediate key clock signal.

In operation S230, according to a sampling result, a phase of the intermediate key clock signal is shifted to be synchronous with a phase of the first key clock signal to obtain a second key clock signal, with a phase of the second key clock signal being synchronous with the phase of the first key clock signal.

In the clock synchronization method provided by the present disclosure, the sampled password sequence is sampled according to the key clock signal, and a correct sampling result can be obtained when the phase of the phase-shifted second key clock signal is synchronous with the phase of the first key clock signal; and the correct sampling result cannot be obtained if the phase of the phase-shifted second key clock signal is not synchronous with the phase of the first key clock signal. With the method, phase synchronization of the master clock apparatus and the slave clock apparatus can be realized through the sampling result using the key clock signal, with no need for the hardware measurement and manual compensation method, so that efficiency and precision are improved; and moreover, there is no need to rely on the loopback line from the line board to the clock board, so that a range of application scenarios is widened, and the error caused by the delays inside the devices is avoided.

Figure 3:
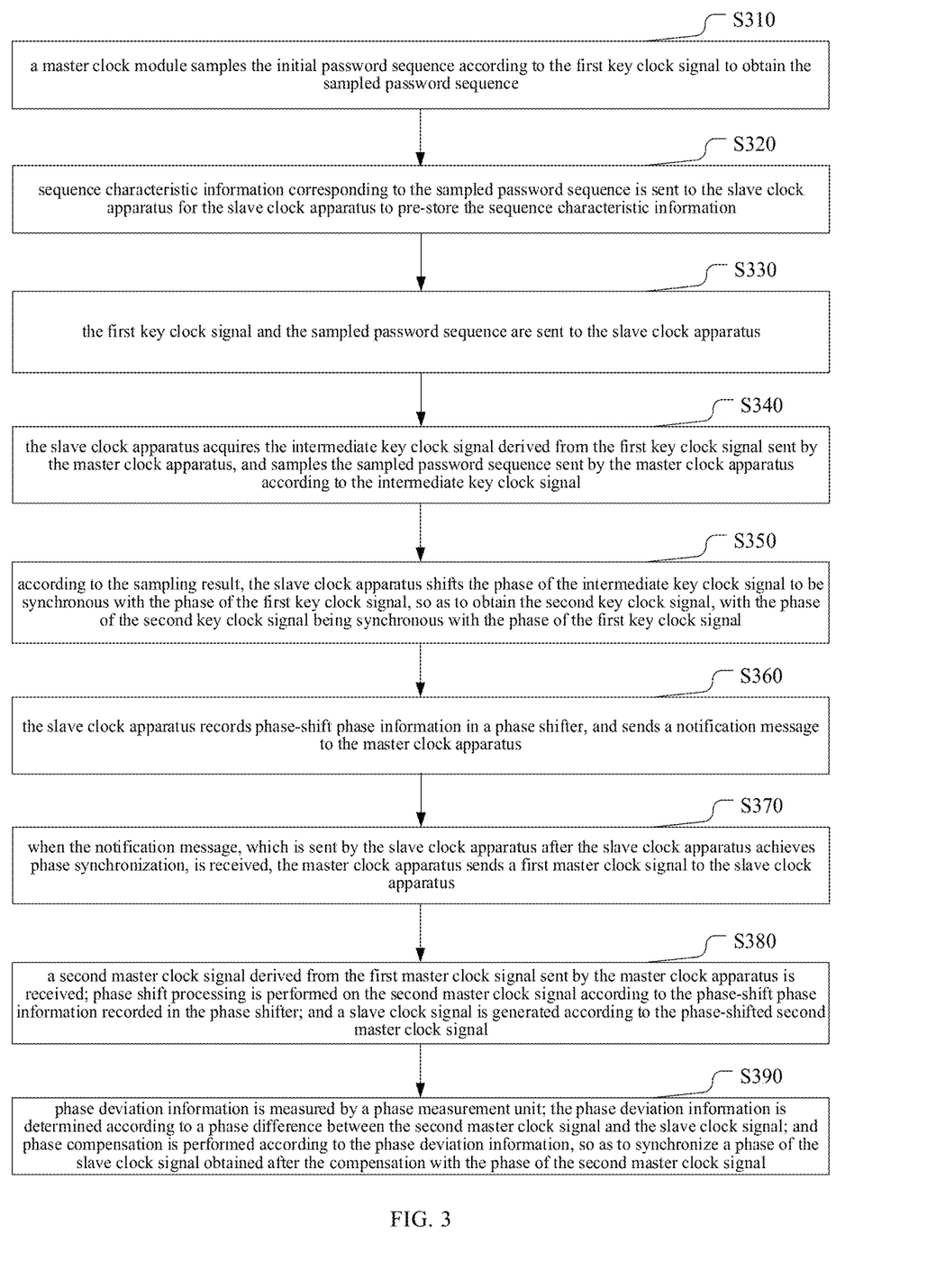
FIG. 3 is a flowchart illustrating a clock synchronization method according to the present disclosure.

FIG. 3 is a flowchart illustrating a clock synchronization method according to the present disclosure. The present embodiment is intended to give a description of an interaction process between the master clock apparatus and the slave clock apparatus. In this embodiment, the master clock apparatus is configured to generate a master clock signal, and the slave clock apparatus is configured to generate a slave clock signal, so as to realize clock synchronization between the master clock apparatus and the slave clock apparatus. Exemplarily, the master clock apparatus and the slave clock apparatus may be separately disposed on different single boards, or the master clock apparatus and the slave clock apparatus may be different functional modules disposed on a same single board, and specific implementations of the master clock apparatus and the slave clock apparatus are not limited in the present disclosure. FIG. 3 is a flowchart illustrating a clock synchronization method according to the present disclosure. As shown in FIG. 3, the method includes the following operations S310 to S390.

In operation S310, a master clock module samples the initial password sequence according to the first key clock signal to obtain the sampled password sequence.

The first key clock signal is generated by the master clock apparatus for the sampling of the initial password sequence. The initial password sequence is a sequence of numbers. Exemplarily, the initial password sequence may be sampled at the transition edges of the first key clock signal to obtain the sampled password sequence. For example, the initial password sequence may be sampled at rising edges of the first key clock signal to obtain the sampled password sequence.

In operation S320, sequence characteristic information corresponding to the sampled password sequence is sent to the slave clock apparatus for the slave clock apparatus to pre-store the sequence characteristic information.

The sequence characteristic information corresponding to the sampled password sequence is used for describing characteristics of the sampled password sequence, so as to allow the slave clock apparatus to determine whether a sampling result is correct according to the sequence characteristic information. Any sequence characteristic information capable of being used for verifying whether the sampling result is correct may be applied to the present disclosure, and a specific implementation of the sequence characteristic information is not limited in the present disclosure.

Exemplarily, the sampled password sequence and the sequence characteristic information corresponding thereto may be obtained in at least one of the following two implementation ways.

In the first implementation way, the master clock apparatus samples the initial password sequence at the transition edges of the first key clock signal to obtain valid sample values corresponding to each transition edge and invalid sample values corresponding to non-transition edges; the invalid sample values corresponding to the non-transition edges are 0; the sampled password sequence includes: the valid sample values corresponding to each transition edge, and the invalid sample values corresponding to the non-transition edges; and the sequence characteristic information corresponding to the sampled password sequence includes: the number of the valid sample values included in the sampled password sequence. In this implementation way, the initial password sequence may be sampled at the rising edges of the first key clock signal to obtain valid sample values corresponding to each rising edge, and correspondingly, values corresponding to non-rising edges may be determined as invalid sample values, and a clear operation is performed on the invalid sample values to make the values corresponding to the non-rising edges be 0. Accordingly, a sequence length of the sampled password sequence is the same as that of the initial password sequence, and the sampled password sequence differs from the initial password sequence in that the values (i.e., the valid sample values) in the initial password sequence corresponding to the rising edges are retained, and the values (i.e., the invalid sample values) in the initial password sequence corresponding to the non-rising edges are cleared to zero. In this implementation way, the slave clock apparatus may merely obtain a value of 0 when performing sampling at the rising edges in a case where the phase of the clock signal received by the slave clock apparatus is not consistent with the phase of the clock signal of the master clock apparatus; and the slave clock apparatus can obtain a value other than 0 merely after a clock phase of the slave clock apparatus is aligned with a clock phase of the master clock apparatus. Thus, in this implementation way, the sequence characteristic information corresponding to the sampled password sequence can be the number of the valid sample values included in the sampled password sequence, so that verification of correctness can be performed by checking whether the number is matched. This implementation way can reduce data transmission volume and increase verification efficiency.

In the second implementation way, the master clock apparatus samples the initial password sequence at the transition edges of the first key clock signal to obtain a valid sample set corresponding to all the transition edges, and the valid sample set includes a plurality of valid sample values; the sampled password sequence is the same as the initial password sequence; and the sequence characteristic information corresponding to the sampled password sequence includes: the valid sample set. In this implementation way, the initial password sequence may also be sampled at the rising edges of the first key clock signal, so as to obtain the valid sample set of a group of valid sample values, and the valid sample set is set as the sequence characteristic information corresponding to the sampled password sequence, that is, the sequence characteristic information includes a group of sequentially arranged valid sample values. Accordingly, the slave clock apparatus may compare the sampling result with all the valid sample values included in the sequence characteristic information one by one. Thus, in this implementation way, there is no need to perform the clear operation on the values in the sampled password sequence corresponding to the non-transition edges, so that the sampled password sequence is the same as the initial password sequence. In this implementation way, the correctness of the sampling result can be verified by comparing the sampling result with all the valid sample values included in the sequence characteristic information one by one, so that an error caused by accidental consistency of the values can be avoided, thereby improving accuracy of the verification.

In operation S330, the first key clock signal and the sampled password sequence are sent to the slave clock apparatus.

Exemplarily, the first key clock signal is sent by a clock synchronization unit to the slave clock apparatus through a data channel, and the sampled password sequence is sent by a clock transmission unit to the slave clock apparatus through a clock channel. Apparently, by configuring the two transmission channels, i.e., the data channel and the clock channel, reliable transmission of the clock signal and data signal can be realized.

In operation S340, the slave clock apparatus acquires the intermediate key clock signal derived from the first key clock signal sent by the master clock apparatus, and samples the sampled password sequence sent by the master clock apparatus according to the intermediate key clock signal.

Due to an inevitable delay of the first key clock signal when the first key clock signal is sent to the slave clock apparatus through the hardware channel, a deviation between the phase of the intermediate key clock signal received by the slave clock apparatus and the phase of the first key clock signal sent by the master clock apparatus is caused. Therefore, when the slave clock apparatus samples the sampled password sequence sent by the master clock apparatus according to the intermediate key clock signal, the slave clock apparatus cannot obtain a correct sampling result. Exemplarily, the slave clock apparatus samples the sampled password sequence at the transition edges (e.g., rising edges) of the intermediate key clock signal to obtain a sampling result corresponding to each transition edge. Since the phase of the intermediate key clock signal is not aligned with the phase of the first key clock signal, the sampling result obtained at the transition edges of the intermediate key clock signal do not match the sequence characteristic information which is received and stored in advance.

In operation S350, according to the sampling result, the slave clock apparatus shifts the phase of the intermediate key clock signal to be synchronous with the phase of the first key clock signal, so as to obtain the second key clock signal, with the phase of the second key clock signal being synchronous with the phase of the first key clock signal.

Exemplarily, the slave clock apparatus receives and stores in advance the sequence characteristic information corresponding to the sampled password sequence sent by the master clock apparatus; the sampled password sequence is obtained by the master clock apparatus sampling the initial password sequence according to the first key clock signal. Accordingly, the slave clock apparatus performs phase shift processing on the intermediate key clock signal according to a match result of the sampling result and the sequence characteristic information, and determines, when a sampling result obtained after the phase shift processing matches the sequence characteristic information, that the phase of the phase-shifted second key clock signal is synchronous with the phase of the first key clock signal. Exemplarily, phase shift processing is performed on the intermediate key clock signal every time it is determined that a current sampling result does not match the sequence characteristic information; and the sampled password sequence is sampled again according to the intermediate key clock signal obtained after current phase shift processing until a sampling result matches the sequence characteristic information.

In operation S360, the slave clock apparatus records phase-shift phase information in a phase shifter, and sends a notification message to the master clock apparatus.

The phase-shift phase information recorded in the phase shifter is used for indicating a phase deviation between the master clock apparatus and the slave clock apparatus, and phase shift processing is performed on a clock signal received by the slave clock apparatus according to the phase-shift phase information, so that the phase of the master clock apparatus can be synchronous with the phase of the slave clock apparatus. The notification message is used for indicating that a synchronization operation is completed and the master clock apparatus and the slave clock apparatus are allowed to transmit data to each other.

In operation S370, when the notification message, which is sent by the slave clock apparatus after the slave clock apparatus achieves phase synchronization, is received, the master clock apparatus sends a first master clock signal to the slave clock apparatus.

Exemplarily, the master clock apparatus sends the first master clock signal to the slave clock apparatus to control data transmission between the slave clock apparatus and the master clock apparatus based on clock synchronization. Both the first master clock signal and the above-mentioned first key clock signal may be generated by the clock transmission unit. Correspondingly, the clock transmission unit has two operating modes, the first mode is a key mode for issuing of the first key clock signal; and the second mode is a master mode for issuing of the first master clock signal. In addition, the master clock apparatus may further include a mode switching unit configured to control the clock transmission unit to be switched between the two modes according to the received notification message.

In operation S380, a second master clock signal derived from the first master clock signal sent by the master clock apparatus is received; phase shift processing is performed on the second master clock signal according to the phase-shift phase information recorded in the phase shifter; and a slave clock signal is generated according to the phase-shifted second master clock signal.

Exemplarily, a phase deviation also exists between the second master clock signal received by the slave clock apparatus and the first master clock signal sent by the master clock apparatus, and the phase deviation is the same as the phase deviation between the second key clock signal received by the slave clock apparatus and the first key clock signal sent by the master clock apparatus. Therefore, after the phase shift processing is performed on the second master clock signal according to the phase-shift phase information recorded in the phase shifter, a phase of the phase-shifted second master clock signal is the same as the phase of the first master clock signal. Thus, the slave clock apparatus generates the slave clock signal corresponding to the second master clock signal with an internal clock module.

In operation S390, phase deviation information is measured by a phase measurement unit; the phase deviation information is determined according to a phase difference between the second master clock signal and the slave clock signal; and phase compensation is performed according to the phase deviation information, so as to synchronize a phase of the slave clock signal obtained after the compensation with the phase of the second master clock signal.

Due to an internal delay of the clock module inside the slave clock apparatus, a phase difference may also exist between the second master clock signal input to the clock module and the slave clock signal output from the clock module. Correspondingly, the phase deviation information is measured by the phase measurement unit, and the phase compensation is performed based on the measurement result. Exemplarily, the compensation may be implemented in at least one of the following two implementation ways.

In the first compensation way, the phase deviation information is sent to a clock unit inside the slave clock apparatus to allow the clock unit inside the slave clock apparatus to perform the phase compensation on the phase-shifted second master clock signal, so as to synchronize the phase of the slave clock signal obtained after the compensation with the phase of the second master clock signal. With this compensation way, the compensation is directly performed inside the slave clock apparatus.

In the second compensation way, the phase deviation information is sent to a clock unit inside the master clock apparatus to allow the clock unit inside the master clock apparatus to perform the phase compensation on the first master clock signal, so as to synchronize the phase of the slave clock signal obtained after the compensation with the phase of the second master clock signal. Correspondingly, the master clock apparatus receives the phase deviation information obtained by the slave clock apparatus through the phase measurement unit; the master clock apparatus performs the phase compensation on the first master clock signal according to the phase deviation information, so as to synchronize the phase of the slave clock signal obtained after the compensation with the phase of the second master clock signal. With this compensation way, the compensation is performed inside the master clock apparatus.

In summary, with the method according to the present embodiment, the sampled password sequence is sampled according to the key clock signal, and when the phase of the phase-shifted second key clock signal is synchronous with the phase of the first key clock signal, the correct sampling result can be obtained; and if the phase of the phase-shifted second key clock signal is not synchronous with the phase of the first key clock signal, the correct sampling result cannot be obtained. With such method, the phase synchronization of the master clock apparatus and the slave clock apparatus can be realized according to the sampling result using the key clock signal, with no need for the hardware measurement and manual compensation method, so that efficiency and precision are improved; and moreover, there is no need to rely on the loopback line from the line board to the clock board, so that the range of application scenarios is widened, and the error caused by the delays inside the devices is avoided. In such method, the first key clock signal is preferably a clock signal with unfixed time intervals, that is, intervals between the transition edges (e.g., the rising edges) of the first key clock signal are not fixed, which can improve accuracy of key verification. Furthermore, the method can further perform the phase compensation on the slave clock signal generated by the clock unit inside the slave clock apparatus, so as to ensure that the phase of the clock signal generated by the master clock apparatus is synchronous with the phase of the clock signal generated by the slave clock apparatus.

Figure 4:
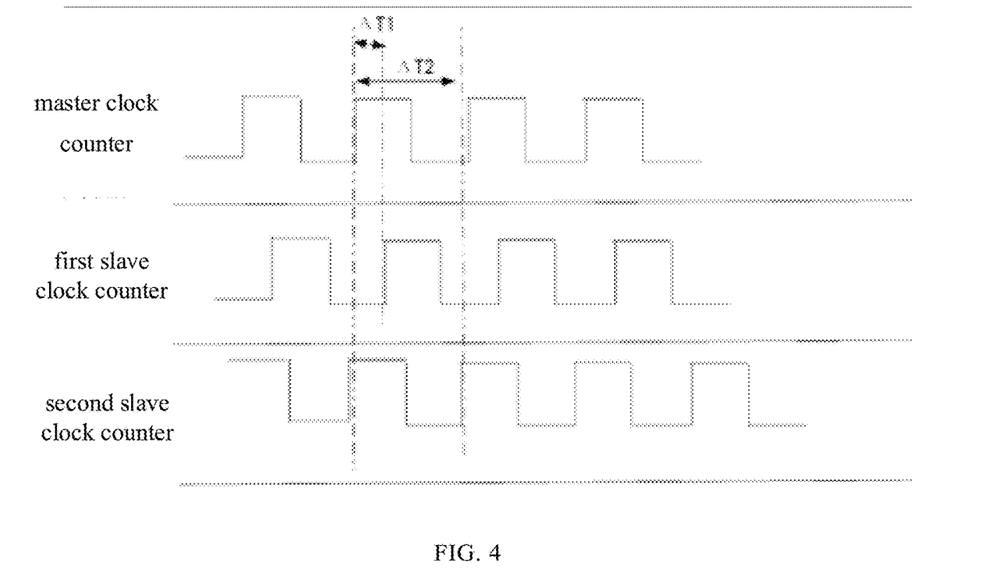
FIG. 4 is a schematic diagram illustrating a principle of an error of a master counter and a slave counter.

Finally, for facilitating the understanding of the present disclosure, details of the implementation of the clock synchronization method according to the embodiment described with reference to FIG. 3 will be illustrated by an example. An application scenario of this example is as follows: with the improvement of integration of communication equipment and increase of functional requirements of the communication equipment, a shortage of terminals of a backplane occurs and is more and more severe; an existing clock unit is connected to a plurality of service boards through a plurality of groups of physical lines, and the plurality of service boards all need clock loopback lines having a length equal to that of the physical lines, so that physical buses of the service boards occupy a lot of terminals of the backplane, which may result in the shortage of the terminals of the backplane. In view of the defect in the existing technology, the technical problem to be solved by the present disclosure is at least as follows: how to measure a delay of a clock signal with high precision and how to compensate for a measurement result, so as to improve time synchronization precision of clocks. One of technical features of the present disclosure at least includes generating a clock key to achieve high-precision compensation for a delay of a clock signal on a hardware one-way link. The above technical feature is different from the loopback double-line measurement method in the existing technology, improves measurement precision, thereby realizing performance improvement. Meanwhile, the present example provides a whole set of method and system implementation modes, including a coding mode, a measuring mechanism, and a confirmation mechanism, so as to ensure reliability and intelligence of a final result. With the method and the system provided in the present example, time synchronization precision of 5G clocks can be effectively improved, hardware cost of the system can be reduced, cost for post development and testing can be reduced, and product development efficiency can be increased with an intelligent solution of software. The present example is mainly applied to a multi-slot hardware communication system or to a scene with a high requirement on high-precision clock time precision, and is especially applicable to a clock time hardware structure with a centralized architecture. The centralized architecture refers to that a master clock time controller is provided in the form of hardware, a plurality of outputs of slave clock time are provided, and high-precision synchronization of the plurality of outputs of slave clock time and an output of master clock time is enabled. The high-precision synchronization of the master clock time and the slave clock time is maintained mainly through internal time counters, and the two counters have high phase synchronization precision, thus enabling high precision of time synchronization. Reference may be made to FIG. 4 for a principle of an error of a high-precision master time counter and a high-precision slave time counter. FIG. 4 is a schematic diagram illustrating a principle of an error of a master counter and a slave counter. As shown in FIG. 4, a phase difference, such as ΔT1 or ΔT2 in FIG. 4, exists between each of different slave counters and a master counter, resulting in an error in time synchronization precision of the slave clock apparatus and the master clock apparatus; and an error in the time synchronization precision also exists between different slave clock apparatuses. For example, both the master clock apparatus and the slave clock apparatus adopt 125 M clocks, and even if a frequency of the master clock is synchronous with a frequency of the slave clock, a phase difference Δ between the master clock and the slave clock is still caused due to a delay of a line, a delay inside a device and the like, which leads to a precision error in time, and the error may be up to 8 ns at most. If a higher frequency is used to maintain the counter, the precision may be improved, but an increase in cost and a limitation on the device are caused, and the error is still inevitable. The phase difference may be measured by a phase measurement module, the precision of the phase difference is determined by the measurement module, and may reach a ps-level. In this example, a phase shift method is provided to measure two clocks, and the precision of the measurement can also reach the ps-level. After specific values of phases of the two clocks are determined, it can be ensured that the precision of the slave counter is consistent with the input precision. Moreover, an overall phase error from the master counter to the slave counter can be accurately known through a one-way link measurement mechanism provided in the present example, and then the slave counter is compensated with the phase difference through the data channel. Thus, it can be ensured that the precision of the master counter is completely consistent with the precision of the slave counter, and ultra-high-precision time synchronization is realized.

Figure 5:
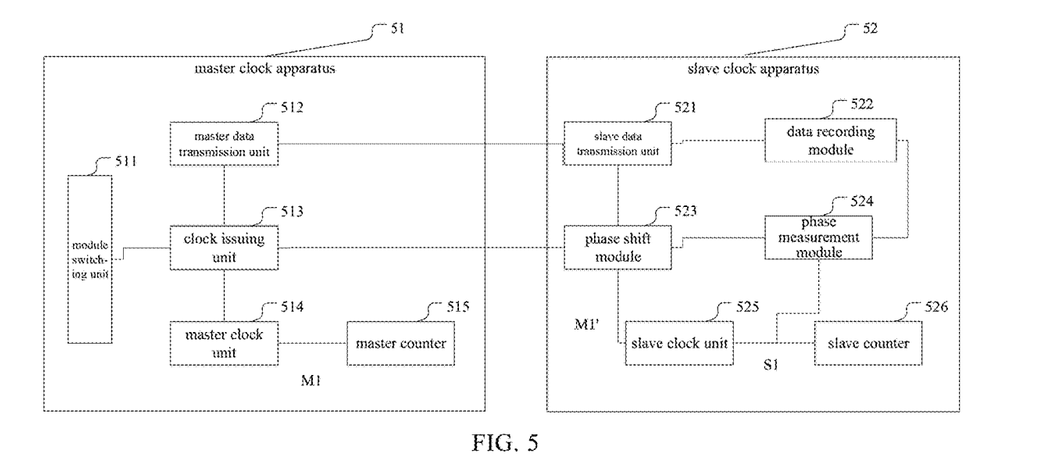
FIG. 5 is a schematic diagram illustrating a structure of a master clock apparatus and a structure of a slave clock apparatus according to the present disclosure.

FIG. 5 is a schematic diagram illustrating a structure of a master clock apparatus and a structure of a slave clock apparatus according to the present disclosure. As shown in FIG. 5, a master clock apparatus 51 includes: a module switching unit 511 (also called a mode switching unit), a master data transmission unit 512, a clock issuing unit 513, a master clock unit 514, and a master counter 515; and a slave clock apparatus 52 includes: a slave data transmission unit 521, a data recording module 522, a phase shift module 523, a phase measurement module 524, a slave clock unit 525, and a slave counter 526. It should be noted that FIG. 5 shows merely one slave clock apparatus, but, in practical applications, a plurality of slave clock apparatuses are usually provided and are respectively connected to the master clock apparatus. Correspondingly, phase synchronization of the plurality of slave clock apparatuses can be realized simultaneously with increased efficiency.

In an exemplary embodiment, the devices shown in FIG. 5 are applicable to a multi-slot clock synchronization system including one clock board and N line boards. N is a natural number greater than 1, the clock board is the master clock apparatus, and the line boards are the slave clock apparatuses. A final objective of the present example is to align an input clock phase of the master counter of the clock board with an input clock phase of the slave counter of each line board, that is, to align a phase at a point M1 with a phase at a point S1 shown in FIG. 5.

Firstly, the modules of the clock board are introduced: the master clock unit is a master clock generated by the clock board, and phase information included in the clock is fixed; the master counter is generated by the master clock unit, and records phase and frequency information of the clock unit, and a phase at the point of the master counter may be assumed to be M1; according to the phase M1, the master clock unit fixedly generates the first key clock signal (also called a transition-edge key) with respect to a period of the clock, and the first key clock signal is issued by the clock issuing unit. The clock issuing unit and the master data transmission unit generate the sampled password sequence (also called password information) by recording the phase information of the master clock of the clock board, and transmit the sampled password sequence to each line board. A method for generating the password information is, for example, as follows: since parallel sampling of data is feasible, that is, each data bit width may be set at the ps-level, data values are increased progressively all the time with no repeated value, the transition-edge key is generated by the master clock unit, the phase information of the master clock unit is M1, a minimum transition-edge interval is 8 ns if the clock output by the master clock unit is 125 MHZ, a phase of each transition edge is aligned with M1, the data at each rising edge of the transition edges is latched to obtain a group of password values, and the group of password values is the sampled password sequence. When the transition-edge key is known, the password values may be known. Similarly, when the password values are known, the transition-edge key may be deduced accordingly, thereby obtaining the phase information M1 of the clock.

A fixed password value may be specified for the whole system, and is latched in the data through the transition-edge key, and data bits not using the latched password value are cleared to zero. On the line board, for the transition-edge key transmitted through the hardware channel, due to a one-way line delay, the key (i.e. the above-mentioned intermediate key clock signal) has a delay in waveform, so that, when reading of the data in the slave data transmission unit is triggered by the rising edges of the delayed waveform, the value of 0 is obtained by the reading, therefore, the desired password values cannot be solved, and the phase information M1 of the clock of the clock board cannot be obtained. In view of this, when the line board shifts, with the local phase shift module, the phase of the transition-edge key sent by the clock board to be consistent with the phase M1 of the original key, all the password values may be obtained, at this time, the one-way line delay is counteracted, the phase information output after the processing of the phase shift module (also called a phase shifter) is the same as the phase information M1 of the clock board, thereby ensuring that a phase output by the phase shift module on each line board is consistent with the phase of the clock board. After a phase shift value of the phase shift module of each line board is fixed, the phase shift value is equal to the one-way line delay. Next, the clock board switches the operating mode of the clock issuing unit through the module switching unit, so that the clock issuing unit is made to stop sending the transition-edge key and normally send the first master clock signal. Since the same hardware channel is used, a delay when issuing the first master clock signal is the same as the delay when issuing the transition-edge key. After the first master clock signal is processed by the phase shift module with the fixed phase shift value, a clock phase M1' output by the phase shift module of the slave clock apparatus is the same as the phase M1 output by the master clock unit. Thus, high-precision phase synchronization based on the hardware one-way line is realized. As can be seen, the solution of phase alignment of the one-way link has obvious advantages over a solution of two-way loopback measurement. Apparently, the solution of phase alignment of the one-way link provided by the present example is also applicable to a system with two-way links, with merely one sending link of the two-way links being used.

In addition, on the line board, the clock output by the phase shift module is subjected to frequency multiplication by the slave clock unit and is then used as the clock of the counter. At this time, a phase difference may exist between a phase of a clock S1 output by the slave clock unit and the input clock phase M1' of the slave clock unit; and even if a delay of the slave clock unit is made to be 0, it cannot be ensured that a delay of a wire on the single board and a delay inside a chip at an input of the counter are 0. Therefore, at this time, the phase difference between the input phase M1' and the phase of S1 needs to be measured by the phase measurement module, a measurement result needs to be recorded in the data recording module, so that compensation may be performed with a measurement value when ultra-high-precision time synchronization of the single board is realized. The data recording module is also configured to record the password values obtained by the sampling of the phase shift module, determine whether the password values are consistent with the password values which are received and stored in advance, generate a decoding complete flag bit (equivalent to the above-mentioned notification message), and return the decoding complete flag bit to the clock board. The clock board switches the operating mode of the clock issuing module according to the returned decoding complete flag bit, so as to enable the clock issuing module to issue the master clock signal. This example may include the following five operations.

Operation one: the line board is powered on and initialized.

Firstly, the line board includes the following modules: the phase shift module, the phase measurement module, the slave data transmission unit, the data recording module, the slave clock unit, and the slave counter. After the line board is initially powered on, it is determined that initialization of each module is normal.

Then, after the line board is initially powered on and it is determined that the initialization of each module is normal, a data channel connection and a hardware channel connection between the clock board and the line board are established. At this time, the clock unit outputs a clock to the counter, but a phase of the clock unit cannot be aligned, so that a count value of the counter cannot be used. When the clock board does not send a signal through the hardware channel, the phase shift module does not perform shift processing on an input phase and is merely in a ready state. The phase measurement module has merely one input and thus cannot perform a phase measurement function, so that the phase measurement module is merely in a ready state. Although no data is transmitted to the slave data transmission unit, the slave data transmission unit is well prepared and can normally perform data reception once the clock board sends data. At this time, the data recording module records a password (i.e. the above-mentioned sequence characteristics) of the whole system, and does not record any specific measurement data from the phase measurement module, but may record labels indicating normal preparation of each module.

Operation two: the clock board is powered on and initialized.

Firstly, the clock board includes the following modules: the master clock unit, the master counter, the module switching unit, the master data transmission unit, and the clock issuing unit. After the clock board is initially powered on, it is determined that initialization of each module is normal.

Then, after the clock board is initially powered on and it is determined that the initialization of each module is normal, a data channel connection between the clock board and the line board is established. If, at this time, the line board is not in place, the channel connection cannot be established, and the complete establishment of the channel connection is subject to the finally powered-on single board. The master clock unit outputs a clock to the master counter, a phase of the clock output by the master clock unit is stable, and the master counter counts normally. The module switching unit has no output on the hardware channel, the clock issuing unit is prepared for generation of the transition-edge key, and the master data transmission unit is ready but has no password data to transmit.

Operation three: a process of compensation method of hardware one-way link from the clock board to the line board is performed.

Firstly, the clock board receives a preparation complete flag signal from the line board, detects and determines that each module is ready, and then starts to perform compensation of hardware one-way link.

Then, the module switching unit controls the clock issuing unit on the hardware channel to issue the transition-edge key in the key mode.

In addition, on the clock board, the master counter is generated by the clock unit, and records the phase and frequency information of the clock unit, and the phase at the point of the master counter may be assumed to be M1; the clock issuing unit fixedly generates the transition-edge key according to the phase M1 of the master clock unit, and the clock issuing unit and the master data transmission unit records the phase information of the master clock of the clock board, and transmits the phase information to each line board.

Figure 6:
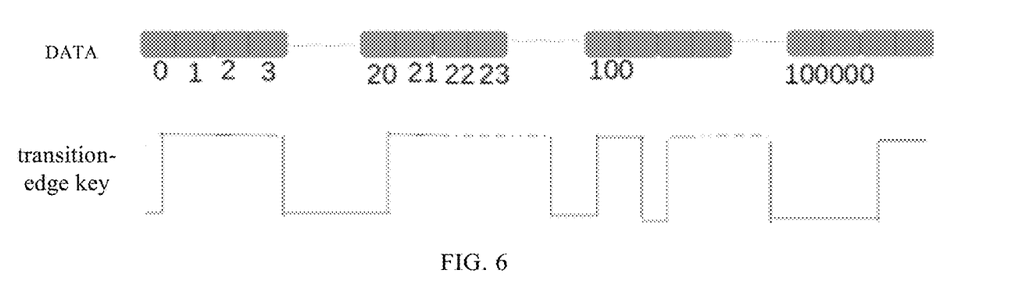
FIG. 6 is a schematic diagram illustrating an example of data and a transition-edge key.

Since parallel sampling of data is feasible, that is, each data bit width may be set at the ps-level, data values are increased progressively all the time with no repeated value, the transition-edge key is generated by the clock unit, the phase information of the master clock unit is M1, a minimum transition-edge interval is 8 ns if the clock output by the clock unit is 125 MHZ, a phase of each transition edge is aligned with M1, and the data at each rising edge of the transition edges is latched to obtain a group of password values. When the transition-edge key is known, the password values may be known. Similarly, when the password values are known, the transition-edge key may be deduced accordingly, thereby obtaining the phase information M1 of the clock. A fixed password may be specified for the whole system, and is latched in the data through the transition-edge key, and data bits with no latching triggered by the rising edges are cleared to zero. The master data transmission unit sends the password values to each line board. FIG. 6 is a schematic diagram illustrating an example of data and a transition-edge key. It can be seen from FIG. 6 that the values of the data are increased progressively all the time with no repeated value, and the transition-edge key is a clock signal with unequal intervals, that is, the interval between the transition edges of the transition-edge key varies. In this way, verification accuracy of the sampling can be improved.

In addition, on the line board, for the transition-edge key transmitted through the hardware channel, due to the one-way line delay such as a wire delay, a device delay, and a delay inside a chip, a certain delay in waveform of the key is caused when the key passes through the hardware channel, so that, when reading of the data in the slave data transmission unit is triggered by the rising edges of the delayed waveform, the value of 0 is obtained by the reading, therefore, the desired password values cannot be solved, and the phase information M1 of the clock of the clock board cannot be obtained.

Correspondingly, on the line board, when the phase of the transition-edge key sent by the clock board is shifted with the local phase shift module to be consistent with the phase M1 of the original key, all the password values may be obtained, at this time, the one-way line delay is counteracted, the phase information M1' output after the processing of the phase shift module is the same as the phase information M1 of the clock board, thereby ensuring that a phase output by the phase shift module on each line board is consistent with the phase of the clock board. After a phase shift value of the phase shift module of each line board is fixed, the phase shift value is equal to the one-way line delay.

The phase shift module may adopt a digital phase shift mode or a phase-locked-loop phase shift mode. In addition, since the line boards are framed devices and the whole system uses the same password, phase adjustment of a plurality of line boards can be performed simultaneously, thereby greatly increasing device efficiency.

In addition, on the line board, after the line delay is compensated with the phase shift value by the phase shift module, the fixed delay value needs to be determined, and a complete flag bit needs to be generated in the data recording unit (that is, to trigger the notification message). There are two ways to determine the fixed delay value.

The first way is as follows: since the password is known to the whole system, when the password originally stored in the data recording unit of the line board is the same as the password decoded after the phase shift processing, the fixed phase shift value is taken as a delay value. When this way is adopted, the system needs to be aware of a password in advance; and correspondingly, when the initial password sequence is sampled to obtain the sampled password sequence, the clear operation is not needed, and merely stable recording is needed. After the fixed phase shift value is determined, the phase shift module does not perform a phase shift action, and the data recording module generates a line delay compensation complete flag bit.

The second way is as follows: the whole system does not need to know a specific password value, and merely needs to know the number of the password values. In a case where this way is adopted, when the initial password sequence is sampled to obtain the sampled password sequence, the clear operation needs to be performed on the invalid sample values corresponding to the non-transition edges. Correspondingly, since the number of the password values triggered by the transition-edge key, i.e., the number of the password values known to the system, is fixed, after the phase shift module performs the shift processing with the fixed compensation value, a fixed number of non-0 values can be solved, otherwise, the number of the values obtained by reading is not equal to the number of the password values known to the system. This way can achieve higher phase shift efficiency. After the fixed phase shift value is determined, the phase shift module does not perform a phase shift action, and the data recording module generates a line delay compensation complete flag bit. In the second way, a determination operation may be added to ensure a correct phase value, but the determination operation is not a must. Exemplarily, the determination operation may be implemented as follows: when the clock board receives the delay compensation complete flag bit from the line board, the clock board may modify the transition-edge key once to generate a password with a fixed number of password values. Since the line delay has been compensated by the phase shift module, the correct number of the password can be directly solved on the line board, which can further ensure that the fixed phase value of the phase shift module is consistent with the line delay, and then a secondary complete flag bit is generated The line board sends the line delay compensation complete flag bit to the module switching unit of the clock board through the data channel, the clock board determines that the line board completes the phase shift compensation, and then switches the operating mode to a master clock mode. Thus, the compensation of hardware one-way link from the clock board to the line board is completed.

Operation four: clock phase alignment of hardware one-way link from the clock board to the line board is performed.

Firstly, on the clock board, sending of the transition-edge key is stopped and the normal master clock signal is sent through module switching control. Since the same hardware channel is used, a delay when issuing the master clock signal is the same as the delay when issuing the transition-edge key. After the master clock signal is processed by the phase shift module with the fixed phase shift value, the output clock phase M1' is the same as the phase M1. Thus, high-precision clock phase synchronization based on the hardware one-way line is realized.

Then, after the clock board is switched to the master clock mode through the module switching control, the master data transmission unit for transmitting the password is not used any more, and whether to transmit the password to each line board is of no great importance. At this time, the master data transmission unit may be turned off. The line board no longer needs to detect the data in the transmission unit.

Operation five: a clock phase of the counter is aligned with an input clock phase on the line board.

Firstly, on the line board, the clock output by the phase shift module is subjected to frequency multiplication by the slave clock unit and is then used as the clock of the counter. At this time, a phase difference may exist between the phase of the clock S1 output by the slave clock unit and the input clock phase M' of the slave clock unit; and even if a delay of the slave clock unit is made to be 0, it cannot be ensured that a delay of a wire on the single board and a delay inside a chip at an input of the counter are 0.

On the line board, the clock output by the phase shift module and the counter clock output by the slave clock unit enter the phase measurement module, the phase measurement module measures the input phase M1' and the phase of S1, the measurement result is recorded in the data recording module, and the precision of the phase measurement module needs to reach the ps-level.

On the line board, there are two ways to achieve phase alignment of the phase M1' and the phase of S1. The first way is that the measurement value in the data recording module is written to the slave clock unit, and the slave clock unit performs compensation with the measurement value through internal phase shift processing, so as to ensure that the output phase of S1 is completely aligned with the phase M1'. The second way is that the measurement value in the data recording module is uploaded to the clock board, and the clock board performs compensation with the measurement value when the single board realizes the ultra-high-precision time synchronization. In addition, the objective of aligning the phase of the input clock with the phase of the clock of the counter can be realized through all digital phase-locked-loop DCO. For example, after the clock phase output by the phase shift module and the phase of the counter output by the clock unit are known, the alignment of the phases may be realized by directly adjusting the phase in a DCO mode of the clock unit.

In summary, compared with the existing technology, the present example at least has the following beneficial effects.

Firstly, higher precision is realized, and the problem of precision of the existing communication equipment is solved. A main reason is that the direct compensation of hardware one-way link is adopted and the link actually used in the system is compensated, so that the problems of the uncertain delay of the device, the delay of the wire, and the delay inside the chip are solved. Secondly, higher efficiency is realized, the clock synchronization method can be realized automatically, and the problem of low-efficiency manual measurement of the existing communication equipment is solved. A reason is that the method provided by the present disclosure can be automatically completed without an external measurement operation. Thirdly, the terminal resources of the backplane are saved because the one-way link merely occupies original hardware link resources and does not need terminal resources for a loopback link. Fourthly, smooth upgrade can be realized with no need to change a hardware structure. A reason therefor is that all the functional modules/components used in the present disclosure can basically exist in the existing hardware structure, and the method provided by the present disclosure can be directly adopted, thereby realizing smooth upgrade. The present example proposes a method for realizing high-precision clock time synchronization by adopting the hardware one-way link for the first time, and the method provided in the present example solves the problem of the delays on the hardware one-way link, and finally realizes high-precision master-slave synchronization.

Figure 7:
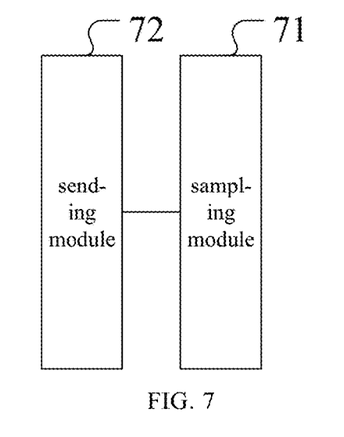
FIG. 7 is a schematic structural diagram of a master clock apparatus according to the present disclosure.

FIG. 7 is a schematic structural diagram of a master clock apparatus according to the present disclosure. As shown in FIG. 7, the apparatus includes: a sampling module 71 configured to sample an initial password sequence according to a first key clock signal to obtain a sampled password sequence; and a sending module 72 configured to send the first key clock signal and the sampled password sequence to a slave clock apparatus to synchronize a phase of a second key clock signal with a phase of the first key clock signal, with the second key clock signal determined by the slave clock apparatus according to the first key clock signal and the sampled password sequence.

In an exemplary embodiment, the sampling module is further configured to send sequence characteristic information corresponding to the sampled password sequence to the slave clock apparatus for the slave clock apparatus to pre-store the sequence characteristic information; then the slave clock apparatus is configured to sample the sampled password sequence according to an intermediate key clock signal derived from the first key clock signal, perform phase shift processing on the intermediate key clock signal according to a match result of a sampling result and the sequence characteristic information, and determine, when a sampling result obtained after the phase shift processing matches the sequence characteristic information, that a phase of the second key clock signal obtained after the phase shift processing is synchronous with the phase of the first key clock signal.

In an exemplary embodiment, the sampling module is configured to sample the initial password sequence at transition edges of the first key clock signal to obtain valid sample values corresponding to each transition edge and invalid sample values corresponding to non-transition edges; the invalid sample values corresponding to the non-transition edges are 0; the sampled password sequence includes: the valid sample values corresponding to each transition edge, and the invalid sample values corresponding to the non-transition edges; and the sequence characteristic information corresponding to the sampled password sequence includes: the number of the valid sample values included in the sampled password sequence.

In an exemplary embodiment, the sampling module is configured to sample the initial password sequence at transition edges of the first key clock signal to obtain a valid sample set corresponding to all the transition edges, and the valid sample set includes a plurality of valid sample values; the sampled password sequence is the same as the initial password sequence; and the sequence characteristic information corresponding to the sampled password sequence includes: the valid sample set.

In an exemplary embodiment, the sending module is configured to send the first key clock signal with a clock synchronization unit to the slave clock apparatus through a data channel, and send the sampled password sequence with a clock transmission unit to the slave clock apparatus through a clock channel.

In an exemplary embodiment, the apparatus further includes: a main control module configured to send, when receiving a notification message sent by the slave clock apparatus after achieving phase synchronization, a first master clock signal to the slave clock apparatus for the slave clock apparatus to perform phase shift processing on a second master clock signal derived from the first master clock signal and generate a slave clock signal according to the phase-shifted second master clock signal.

In an exemplary embodiment, the main control module is further configured to receive phase deviation information acquired by the slave clock apparatus through a phase measurement unit, with the phase deviation information determined according to a phase difference between the second master clock signal and the slave clock signal; and phase compensation is performed on the first master clock signal according to the phase deviation information, so as to synchronize a phase of the slave clock signal obtained after the compensation with a phase of the second master clock signal.

Figure 8:
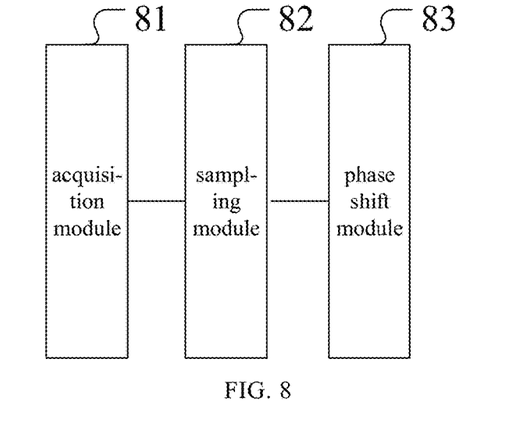
FIG. 8 is a schematic structural diagram of a slave clock apparatus according to the present disclosure.

FIG. 8 is a schematic structural diagram of a slave clock apparatus according to the present disclosure. As shown in FIG. 8, the apparatus includes: an acquisition module 81 configured to acquire an intermediate key clock signal derived from a first key clock signal sent by a master clock apparatus; a sampling module 82 configured to sample a sampled password sequence sent by the master clock apparatus according to the intermediate key clock signal; and a phase shift module 83 configured to shift, according to a sampling result, a phase of the intermediate key clock signal to be synchronous with a phase of the first key clock signal to obtain a second key clock signal, with a phase of the second key clock signal being synchronous with the phase of the first key clock signal.

In an exemplary embodiment, the acquisition module is further configured to receive and store sequence characteristic information which is sent by the master clock apparatus and corresponds to the sampled password sequence, with the sampled password sequence obtained by the master clock apparatus sampling an initial password sequence according to the first key clock signal; then the phase shift module is configured to perform phase shift processing on the intermediate key clock signal according to a match result of the sampling result and the sequence characteristic information, and determine, when a sampling result obtained after the phase shift processing matches the sequence characteristic information, that the phase of the intermediate key clock signal is shifted to be synchronous with the phase of the first key clock signal.

In an exemplary embodiment, the phase shift module is configured to perform phase shift processing on the intermediate key clock signal every time it is determined that a current sampling result does not match the sequence characteristic information; and the sampled password sequence is sampled again according to the intermediate key clock signal obtained after current phase shift processing until a sampling result matches the sequence characteristic information.

In an exemplary embodiment, the sequence characteristic information corresponding to the sampled password sequence includes: the number of valid sample values included in the sampled password sequence; alternatively, the sequence characteristic information corresponding to the sampled password sequence includes: a valid sample set corresponding to all transition edges, and the valid sample set includes a plurality of valid sample values; and the valid sample values are obtained by sampling the initial password sequence at transition edges of the first key clock signal.

In an exemplary embodiment, the phase shift module is further configured to record phase-shift phase information in a phase shifter and send a notification message to the master clock apparatus, to receive a second master clock signal derived from a first master clock signal sent by the master clock apparatus, to perform phase shift processing on the second master clock signal according to the phase-shift phase information recorded in the phase shifter, and to generate a slave clock signal according to the phase-shifted second master clock signal.

In an exemplary embodiment, the apparatus further includes: a phase measurement module configured to measure phase deviation information; the phase deviation information is determined according to a phase difference between the second master clock signal and the slave clock signal; and phase compensation is performed according to the phase deviation information, so as to synchronize a phase of the slave clock signal obtained after the compensation with a phase of the second master clock signal.

In an exemplary embodiment, the phase measurement module is configured to send the phase deviation information to a clock unit inside the slave clock apparatus to allow the clock unit inside the slave clock apparatus to perform phase compensation on the phase-shifted second master clock signal, so as to synchronize the phase of the slave clock signal obtained after the compensation with the phase of the second master clock signal. Alternatively, the phase measurement module is configured to send the phase deviation information to a clock unit inside the master clock apparatus to allow the clock unit inside the master clock apparatus to perform phase compensation on the first master clock signal, so as to synchronize the phase of the slave clock signal obtained after the compensation with the phase of the second master clock signal.

The present disclosure further provides a clock synchronization system, including: the master clock apparatus and the slave clock apparatus as described above, and the number of slave clock apparatuses is more than one.

Figure 9:
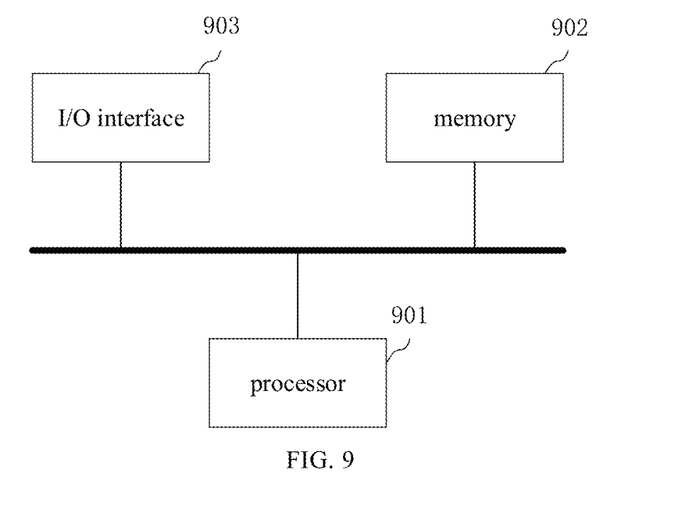
FIG. 9 is a schematic structural diagram of an electronic device according to the present disclosure.

In addition, referring to FIG. 9, the present disclosure further provides an electronic device, which includes: one or more processors 901; a memory 902 having stored thereon one or more programs which, when executed by the one or more processors, cause the one or more processors to implement the clock synchronization method described in any one of the above embodiments; and one or more I/O interfaces 903 connected between the processor(s) and the memory and configured to enable information interaction between the processor(s) and the memory.

The processor 901 is a device having a data processing capability, and includes, but is not limited to, a Central Processing Unit (CPU); the memory 902 is a device having a data storage capability, and includes, but is not limited to, a Random Access Memory (RAM, more specifically, a Synchronous Dynamic RAM (SDRAM), a Double Data Rate SDRAM (DDR SDRAM), etc.), a Read-Only Memory (ROM), an Electrically Erasable Programmable Read-Only Memory (EEPROM), and a flash memory (FLASH); and the I/O interface (read/write interface) 903 is connected between the processor 901 and the memory 902, may enable the information interaction between the processor 901 and the memory 902, and includes, but is not limited to, a data bus (Bus).

In some embodiments, the processor 901, the memory 902, and the I/O interface 903 are connected to each other through a bus, and then are connected to other components of a computing device.

The present disclosure further provides a computer-readable medium having stored thereon a computer program which, when executed by a processor, implements the clock synchronization method described in any one of the above embodiments.

With the clock synchronization method, apparatus and system, the electronic device and the readable medium provided by the embodiments of the present disclosure, the initial password sequence is sampled according to the first key clock signal to obtain the sampled password sequence; and the first key clock signal and the sampled password sequence are sent to the slave clock apparatus, so that the slave clock apparatus may sample the sampled password sequence according to the intermediate key clock signal derived from the first key clock signal, and perform the phase shift processing on the intermediate key clock signal according to the sampling result, so as to synchronize the phase of the phase-shifted intermediate key clock signal (i.e., the second key clock signal) with the phase of the first key clock signal. By sampling the sampled password sequence according to the key clock signal, the correct sampling result can be obtained when the phase of the second key clock signal is synchronous with the phase of the first key clock signal; and the correct sampling result cannot be obtained if the phase of the second key clock signal obtained after the phase shift processing is not synchronous with the phase of the first key clock signal. Thus, the phase synchronization of the master clock apparatus and the slave clock apparatus can be realized through the sampling result using the key clock signal, with no need for the hardware measurement and manual compensation method, so that efficiency and precision are improved; and moreover, there is no need to rely on the loopback line from the line board to the clock board, so that the range of application scenarios is widened, and the error caused by the delays inside the devices is avoided.

It should be understood by those of ordinary skill in the art that the functional modules/units in all or some of the operations, the systems and the devices in the method disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or operation may be performed through cooperation of several physical components. Some or all of the components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, an RAM, an ROM, an EEPROM, a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses the exemplary embodiments using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details can be made without departing from the scope of the present disclosure of the appended claims.

What is claimed is:

1. A clock synchronization method for a master clock apparatus, comprising:
   sampling an initial password sequence according to a first key clock signal to obtain a sampled password sequence; and
   sending the first key clock signal and the sampled password sequence to a slave clock apparatus to synchronize a phase of a second key clock signal with a phase of the first key clock signal, with the second key clock signal determined by the slave clock apparatus according to the first key clock signal and the sampled password sequence.

2. The method of claim 1, after obtaining the sampled password sequence, further comprising: sending sequence characteristic information corresponding to the sampled password sequence to the slave clock apparatus for the slave clock apparatus to pre-store the sequence characteristic information; wherein
   the slave clock apparatus samples the sampled password sequence according to an intermediate key clock signal derived from the first key clock signal, performs phase shift processing on the intermediate key clock signal according to a match result of a sampling result and the sequence characteristic information, and determines, when a sampling result obtained after the phase shift processing matches the sequence characteristic information, that a phase of the second key clock signal obtained after the phase shift processing is synchronous with the phase of the first key clock signal.

3. The method of claim 1, wherein sampling the initial password sequence according to the first key clock signal to obtain the sampled password sequence comprises:
   sampling the initial password sequence at transition edges of the first key clock signal to obtain valid sample values corresponding to each transition edge and invalid sample values corresponding to non-transition edges; wherein the invalid sample values corresponding to the non-transition edges are 0;
   wherein the sampled password sequence comprises: the valid sample values corresponding to each transition edge, and the invalid sample values corresponding to the non-transition edges; and sequence characteristic information corresponding to the sampled password sequence comprises: a number of the valid sample values included in the sampled password sequence.

4. The method of claim 1, wherein sampling the initial password sequence according to the first key clock signal to obtain the sampled password sequence comprises:
   sampling the initial password sequence at transition edges of the first key clock signal to obtain a valid sample set corresponding to all the transition edges, wherein the valid sample set includes a plurality of valid sample values; and the sampled password sequence is the same as the initial password sequence;
   wherein sequence characteristic information corresponding to the sampled password sequence comprises: the valid sample set.

5. The method of claim 1, wherein sending the first key clock signal and the sampled password sequence to the slave clock apparatus comprises:
   sending, by a clock synchronization unit included in the master clock apparatus, the first key clock signal to the slave clock apparatus through a data channel, and sending, by a clock transmission unit included in the master clock apparatus, the sampled password sequence to the slave clock apparatus through a clock channel.

6. The method of claim 1, after sending the first key clock signal and the sampled password sequence to the slave clock apparatus, further comprising:
   when receiving a notification message sent by the slave clock apparatus after achieving phase synchronization, sending a first master clock signal to the slave clock apparatus for the slave clock apparatus to perform phase shift processing on a second master clock signal derived from the first master clock signal and generate a slave clock signal according to the phase-shifted second master clock signal.

7. The method of claim 6, after sending the first master clock signal to the slave clock apparatus, further comprising:
   receiving phase deviation information obtained by the slave clock apparatus through phase measurement, wherein the phase deviation information is determined according to a phase difference between the second master clock signal and the slave clock signal; and
   performing phase compensation on the first master clock signal according to the phase deviation information, so as to synchronize a phase of the slave clock signal obtained after the phase compensation with a phase of the second master clock signal.

8. A clock synchronization method for a slave clock apparatus, comprising:
   acquiring an intermediate key clock signal derived from a first key clock signal sent by a master clock apparatus;

sampling a sampled password sequence sent by the master clock apparatus according to the intermediate key clock signal; and shifting, according to a sampling result, a phase of the intermediate key clock signal to be synchronous with a phase of the first key clock signal to obtain a second key clock signal, with a phase of the second key clock signal being synchronous with the phase of the first key clock signal.

9. The method of claim 8, before acquiring the intermediate key clock signal derived from the first key clock signal sent by the master clock apparatus, further comprising:

receiving and storing sequence characteristic information which is sent by the master clock apparatus and corresponds to the sampled password sequence;

wherein the sampled password sequence is obtained by the master clock apparatus sampling an initial password sequence according to the first key clock signal;

wherein shifting, according to the sampling result, the phase of the intermediate key clock signal to be synchronous with the phase of the first key clock signal comprises:

performing phase shift processing on the intermediate key clock signal according to a match result of the sampling result and the sequence characteristic information, and determining, when a sampling result obtained after the phase shift processing matches the sequence characteristic information, that the phase of the intermediate key clock signal is shifted to be synchronous with the phase of the first key clock signal.

10. The method of claim 9, wherein performing phase shift processing on the intermediate key clock signal according to the match result of the sampling result and the sequence characteristic information and determining, when the sampling result obtained after the phase shift processing matches the sequence characteristic information, that the phase of the intermediate key clock signal is shifted to be synchronous with the phase of the first key clock signal comprises:

performing phase shift processing on the intermediate key clock signal every time it is determined that a current sampling result does not match the sequence characteristic information; and sampling the sampled password sequence again according to the intermediate key clock signal obtained after current phase shift processing until a sampling result matches the sequence characteristic information.

11. The method of claim 9, wherein the sequence characteristic information corresponding to the sampled password sequence comprises: a number of valid sample values included in the sampled password sequence; or, the sequence characteristic information corresponding to the sampled password sequence comprises: a valid sample set corresponding to all transition edges, wherein the valid sample set comprises a plurality of valid sample values;

wherein the valid sample values are obtained by sampling the initial password sequence at the transition edges of the first key clock signal.

12. The method of claim 8, after shifting, according to the sampling result, the phase of the intermediate key clock signal to be synchronous with the phase of the first key clock signal to obtain the second key clock signal, further comprising:

recording phase-shift phase information in a phase shifter, and sending a notification message to the master clock apparatus;

receiving a second master clock signal derived from a first master clock signal sent by the master clock apparatus;

performing phase shift processing on the second master clock signal according to the phase-shift phase information recorded in the phase shifter; and generating a slave clock signal according to the phase-shifted second master clock signal.

13. The method of claim 12, after generating the slave clock signal according to the phase-shifted second master clock signal, further comprising:

measuring phase deviation information with a phase measurement unit;

wherein the phase deviation information is determined according to a phase difference between the second master clock signal and the slave clock signal; and performing phase compensation according to the phase deviation information, so as to synchronize a phase of the slave clock signal obtained after the phase compensation with a phase of the second master clock signal.

14. The method of claim 13, wherein performing phase compensation according to the phase deviation information so as to synchronize the phase of the slave clock signal obtained after the phase compensation with the phase of the second master clock signal comprises: sending the phase deviation information to a clock unit inside the slave clock apparatus to allow the clock unit inside the slave clock apparatus to perform phase compensation on the phase-shifted second master clock signal, so as to synchronize the phase of the slave clock signal obtained after the phase compensation with the phase of the second master clock signal; or, performing phase compensation according to the phase deviation information so as to synchronize the phase of the slave clock signal obtained after the phase compensation with the phase of the second master clock signal comprises: sending the phase deviation information to a clock unit inside the master clock apparatus to allow the clock unit inside the master clock apparatus to perform phase compensation on the first master clock signal, so as to synchronize the phase of the slave clock signal obtained after the phase compensation with the phase of the second master clock signal.

15. A master clock apparatus, comprising a processor and a memory having at least one instruction stored thereon which, when executed by the processor, causes the processor to perform the method of claim 1.

16. A slave clock apparatus, comprising a processor and a memory having at least one instruction stored thereon which, when executed by the processor causes the processor to perform the method of claim 8.

17. A clock synchronization system, comprising: a master clock apparatus, and the slave clock apparatus of claim 16; wherein the number of slave clock apparatuses is more than one, and the master clock apparatus comprises a processor and a memory having at least one instruction stored thereon which, when executed by the processor, causes the processor to:

sample an initial password sequence according to a first key clock signal to obtain a sampled password sequence; and send the first key clock signal and the sampled password sequence to the slave clock apparatus to synchronize a phase of a second key clock signal with phase of the first key clock signal, with the second key clock signal determined by the slave clock apparatus according to the first key clock signal and the sampled password sequence.

18. An electronic device, comprising:
one or more processors;
a memory having stored thereon one or more programs which, when executed by the one or more processors, cause the one or more processors to implement the method of claim 1; and
one or more input/output (I/O) interfaces connected between the one or more processors and the memory and configured to enable information interaction between the one or more processors and the memory.

19. A non-transitory computer-readable medium having stored thereon a computer program which, when executed by a processor, implements the method of claim 1.

20. A non-transitory computer-readable medium having stored thereon a computer program which, when executed by a processor, implements the method of claim 8.

* * * * *